United States Patent
Fillion (10) Patent No.: US 8,449,951 B2
(45) Date of Patent: May 28, 2013

(54) APPARATUS AND METHOD OF DENSIFYING POROUS ARTICLES

(75) Inventor: Arnaud Fillion, Blanquefort (FR)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 398 days.

(21) Appl. No.: 12/765,395

(22) Filed: Apr. 22, 2010

(65) Prior Publication Data

US 2010/0272923 A1     Oct. 28, 2010

Related U.S. Application Data

(60) Provisional application No. 61/172,715, filed on Apr. 25, 2009.

(51) Int. Cl.
| | |
|---|---|
| *B05D 3/02* | (2006.01) |
| *B05D 7/22* | (2006.01) |
| *B05D 5/06* | (2006.01) |
| *H05B 6/02* | (2006.01) |
| *H05B 6/24* | (2006.01) |

(52) U.S. Cl.
USPC ........... 427/591; 427/543; 427/544; 427/230; 427/226; 427/228

(58) Field of Classification Search
USPC .............. 427/154, 228, 230, 231, 430.1, 543, 427/544, 591, 226, 227, 248.1, 255.12, 585, 427/587
See application file for complete search history.

(56) References Cited

U.S. PATENT DOCUMENTS

| | | | |
|---|---|---|---|
| 4,472,454 A * | 9/1984 | Houdayer et al. ............ | 427/591 |
| 5,389,152 A | 2/1995 | Thurston et al. | |
| 5,397,595 A | 3/1995 | Carroll et al. | |
| 5,547,717 A | 8/1996 | Scaringella et al. | |
| 5,733,611 A * | 3/1998 | Thurston et al. .............. | 427/591 |
| 5,981,002 A | 11/1999 | Connors, Jr. | |
| 6,726,962 B1 | 4/2004 | Loszewski | |
| 6,994,886 B2 * | 2/2006 | David et al. ................... | 427/226 |
| 2004/0022956 A1 | 2/2004 | Patrick et al. | |
| 2009/0087588 A1 | 4/2009 | Fillion | |

FOREIGN PATENT DOCUMENTS

| | | |
|---|---|---|
| WO | WO 2008/017676 | 2/2008 |
| WO | WO 2008/017677 | 2/2008 |
| WO | WO 2008/017678 | 2/2008 |
| WO | WO 2009/037265 | 3/2009 |

* cited by examiner

*Primary Examiner* — Michael Cleveland
*Assistant Examiner* — Michael Wieczorek
(74) *Attorney, Agent, or Firm* — Pillsbury Winthrop Shaw Pittman, LLP (57) ABSTRACT

A method and apparatus are disclosed for improving densification of porous substrate using a film boiling process. In particular, the disclosed method and apparatus permit more complete densification of a substrate (i.e., densification closer to the surface of the substrate) by selectively providing a sort of barrier that reduces cooling of the surface of the substrate being densified caused by contact with the relatively cool boiling liquid precursor of the densifying material, such as carbon. In particular, contact between the substrate and the liquid precursor is reduced using one or both of physical barriers (such as a mesh material) or structures that promote the formation of an insulating gaseous layer between the substrate and the liquid precursor (such as a plate closely spaced apart from the surface of the porous substrate). The barrier is moved into operational position before the applied power level increases sharply (as is known) near the end of the film boiling densification process.

21 Claims, 7 Drawing Sheets

APPARATUS AND METHOD OF DENSIFYING POROUS ARTICLES

CROSS REFERENCE TO RELATED APPLICATION

This application claims priority and benefit under 35 U.S.C. §119(e) to U.S. Provisional Patent Application No. 61/172,715, filed on Apr. 25, 2009. The content of that application is incorporated herein in its entirety by reference.

FIELD OF THE INVENTION

The present invention relates to densifying porous articles.

BACKGROUND OF THE INVENTION

In the field of friction materials, it is generally known to use substrates made from porous materials to manufacture friction members, such as friction brake disks. The manufacture of such friction members generally begins with the construction of a porous, usually fibrous, preform, such as an annular preform.

The annular preforms can be constructed using several different known methods. For example, carbon fiber fabric plies can be needled together and annular preforms can be cut from the stacked material. The plies may be made, for example, from airlaid fibers or woven fibers. Also, near net shape preforms can be formed, for example, by braiding the carbon fiber into a desired shape. Certain carbon fiber fabrics are known having a weave that facilitates laying the fabric in a spiral form. In this context, "near-net" refers to forming structures having a form close to a desired shape of the final article, such as an annular brake disk.

Oxidized polyacrylonitride ("PAN") fibers or pitch-based fibers are common examples of starting fibers used in this type of application. Subsequently, these fibers may be carbonized in a high temperature treatment step. In another conventional approach, the starting fibers are formed using a resin or pitch, and the resultant mass is later cured with a reactive gas, such as nitrogen gas. The thusly cured mass is then carbonized to obtain a semi-rigid preform.

In any event, it is desirable to further densify the resulting porous preform (especially with a carbonaceous material) so as to obtain desired friction and mechanical properties.

Chemical vapor infiltration ("CVI") is a conventional densification technique for obtaining carbon/carbon (sometimes referred to in the art as "C/C") composite materials. CVI typically uses a hydrocarbon-containing gas to infiltrate a porous preform. The CVI gas is then cracked under high temperatures so as to leave a carbon coating on the fiber structure of the preform, thereby increasing the density of the article.

CVI using a gaseous precursor typically requires several hundred hours of processing in order to obtain a carbon/carbon structure having desired density characteristics and mechanical properties. By way of example, a typical CVI process includes a first gas infiltration cycle performed, for example, over approximately 300-500 hours or more.

However, conventional CVI frequently causes rapid blockage of the surface porosity of the preform before interior portions of the preform are adequately densified. In order to "reopen" the surface porosity (to allow the gaseous precursor to continue to reach interior parts of the article), an intermediate machining step becomes necessary. In general, this intermediate machining (using a known method, such as milling) removes surface layers of the preform having carbon-blocked pores to expose open pores of the preform, so that the hydrocarbon gas can again infiltrate the preform structure. Taking into account that several hundred preforms are densified in a typical densification, the intermediate machining step can add as much as 48 hours to the overall CVI densification process.

Once the intermediate machining of the partially densified articles is completed, a second CVI process is performed to make use of the reopened surface porosity of the preforms, which can last, for example, another 300-500 hours or more. This generally completes the densification process.

Another approach to densifying porous preforms uses a liquid instead of gaseous hydrocarbon precursor. This method of densification is sometimes referred to in the art as "film boiling" or "rapid densification."

The use of liquid precursors for densification is discussed in, for example, U.S. Pat. Nos. 4,472,454, 5,389,152, 5,397,595, 5,733,611, 5,547,717, 5,981,002, and 6,726,962. Each and every one of these documents is incorporated herein by reference in its entirety in all venues and jurisdictions where incorporation by reference is permitted.

Film boiling densification generally involves immersing a porous preform in a liquid held in a reaction chamber, particularly a liquid hydrocarbon, so that the liquid substantially completely infiltrates the pores and interstices of the preform. Thereafter, the immersed preform is inductively heated to a temperature above the decomposition temperature of liquid hydrocarbon (typically 1000° C. or more). More particularly, the liquid hydrocarbon adjacent to the inductively heated preform structure dissociates into various gas phase species within the preform porosity. Further thermal decomposition of the gas phase species results in the formation of pyrrolitic carbon on interior surfaces in the open regions of the porous material.

The liquid hydrocarbon precursor may be cyclopentane, cyclohexane, 1-hexene, gasoline, toluene, methylcyclohexane, n-hexane, kerosene, hydrodesulfurized kerosene, benzene, or combinations thereof. In addition, the liquid precursor may contain an organosilane, such as methyltrichlorosilane, dimethyldichlorosilane, methyldichlorosilane, or tris-n-methyl amino silane. In some cases, the liquid precursor may be a mixture of an organosilane and a hydrocarbon.

The liquid precursor may be formulated in a known way to obtain combination decomposition products. For example, the decomposition product may comprise silicon carbide and silicon nitride, or carbon/silicon carbide or carbon/silicon nitride.

Because of the boiling liquid surrounding the preform, a strong thermal gradient develops between the inner (i.e., core) and the outer (i.e., peripheral) parts of the disks. Densification generally starts at core regions because the temperature there is relatively higher than at more outward surface parts. The porous article can therefore be substantially completely densified in only one densification process step, much faster than when using the regular isobar CVI ("I-CVI") process (where densification preferably first occurs at surfaces of the articles), which tends to seal the porosity of the article and prevent further gas infiltration. The kinetic of liquid precursor densification may be on the order of 100 times faster than using a gas infiltration step.

However, because the preform is immersed in a relative cool, albeit boiling, liquid, a high power level is necessary to keep the maximum temperature of the preform above the cracking temperature of the liquid precursor. For example, in the case of densification using cyclohexane as a precursor, an interior temperature of the porous article during densification may be between about 900° C. and about 1200° C. although the surrounding liquid cyclohexane temperature is only about 80° C. to about 82° C. As a result, overall electric consumption is high compared to the standard I-CVI process.

Also, as the densification front moves toward the peripheral edges/surfaces of the porous preform, the power must be progressively increased in order to maintain a necessary temperature of the densification front. Thus, at the end of a densification cycle, the power level might be 5 times or more that of the initial power level. This increases the electric consumption and necessitates costly power supplies able to deliver the required heating.

Certain conventional solutions to these problems have been proposed in U.S. Pat. Nos. 6,994,886 and 5,981,002. For example, the preforms can be produced so as to be oversized, and densification is stopped when the densification front is still slightly (e.g., a few millimeters) away from the surface of porous article. This approach decreases the power needed to heat the core of the preform because the preform itself effectively acts as an insulator—the thicker the preform is, the better it serves to insulate its interior relative to the above-described thermal gradient. Also, the required final power to achieve the densification will be lower, depending on the thickness of sacrificial material (i.e., the depth of the undensified material at the surface of the preform). However, this approach presumes and necessarily results in a certain level of material waste from machining off exterior portions of the thick preform. In addition, when thicker preforms are used, infiltration as a whole becomes relatively more difficult. This can cause the core part of the preform to be insufficiently densified because the precursor has difficulty in reaching the interior of the preform.

Another approach relates to wrapping a preform with another material to create a physical boundary between the boiling liquid precursor and the preform itself. Depending on the nature of the material that is used, different results are expected. In U.S. Pat. No. 5,981,002, a layer of carbon felt is proposed to improve the edge densification of the disk. The carbon felt allows the densification front to move closer to the edge (i.e., surfaces) of the preform using less power. The carbon felt can withstand the high temperature of the densification front as it approaches the surface of the preform. However, in certain situations, this approach cannot be used. For example, when the preform is inductively heated by electromagnetic coupling, the carbon felt itself may be inductively heated (like the preform) and become densified during the densification cycle. This would seal the porosity of the article, preventing the precursor from reaching interior parts of the preform and compromising the proper densification of the disk, as in conventionally recognized.

U.S. Pat. No. 6,994,886 discloses using one or more layers of a polytetrafluoroethylene ("PTFE") textile (sometimes commercially known under the trademark Gore-Tex®). This patent discloses that liquid precursor infiltration into the preform is limited by PTFE so the required electrical power to densify the material is significantly decreased and the densification rate increased. However, because of the low permeability of the PTFE textile (compared to the permeability of carbon felt, for example) the transfer of precursor to interior parts of the preform is hindered. Accordingly, when articles being densified are relatively thick, there is depletion or deficiency of liquid precursor at the core portions of the preform. This can result in an insufficiently densified core (sometimes referred to as a "hollow" core).

For example, if a 25 mm thick carbon brake disk preform is to be densified, the use of Gore-Tex® PTFE textile to insulate the preform dramatically decreases the densification kinetic (i.e., results in a slower densification) in order to avoid a hollow core. Thus, the benefits of using PTFE as disclosed in U.S. Pat. No. 6,994,886 have to be balanced against a corresponding increase of the cycle time.

Adding an insulation layer such carbon felt or Gore-Tex® PTFE textile as is known is believed to cause a "flattening" of the thermal profile inside the preform and decrease the transfer or infiltration of precursor into an interior of the preform. Both of these parameters are involved in the core densification. For a Gore-Tex® PTFE textile, the low permeability of the fabric prevents, or at least hinders, the liquid precursor from entering the preform, so the infiltration of the liquid precursor into interior parts of the preform is dramatically retarded. A severe starvation of the gas phase species subsequently occurs when the kinetic of deposition is kept in the usual range. That is, the diminished infiltration of the liquid precursor into the core cannot adequately support the generation of the required gas phase species. In general, the conventional use of PTFE textile in this manner necessitates a lower temperature of densification in order to get the same densification homogeneity. As a result, the cycle time for densification increases.

When carbon felt is used in the above-described conventional manner, the negative effect on precursor transfer is not as great as with as with the PTFE textile. However, when the power increases in order to make the densification front move forward, sometimes the carbon felt itself is inductively heated by the induction field. As a result, the carbon felt also becomes densified. As soon as densification starts inside the felt insulation, the porosity of the underlying preform begins to become closed off, so that some areas of the preform close to the felt remain under-densified when the cycle is finished.

Currently pending U.S. patent application Ser. No. 12/210,228 (published on Apr. 2, 2009 as Published Patent Application US 2009/087588, now U.S. Pat. No. 8,163,339,) is directed to using a polytetrafluoroethylene (sometimes referred to as "PTFE" or Teflon®) mesh having a porosity of between 30% and 60% to wrap a preform to be densified, instead of a carbon felt, as is known in the conventional art. Although an improvement in surface densification is obtained, it has been observed that depending on the geometry of the part being densified, parts of the densification front can reach the surface of the part (particularly wear surfaces, in the case of a brake disk) well before reaching radially inner and outer edges (sometimes referred to as inner and outer diameters) of the disk. In such a situation, the temperature of the part at the location where the densification front has actually reached the surface of the part is hot enough to thermally decompose (or "crack") the liquid hydrocarbon precursor adjacent to the disk before the precursor has a chance to infiltrate the part. This creates carbon particles dispersed in the liquid precursor, the carbon being "wasted" in the sense that it is not deposited within the preform to densify the brake disk. It follows that liquid precursor consumption undesirably increases because of this premature hydrocarbon cracking, thereby adding to production costs.

An alternative feature disclosed in U.S. patent application Ser. No. 12/210,228, now U.S. Pat. No. 8,163,339, is providing a wall or other partition (either partially perforated or solid) closely sandwiching the preform at a fixed distance throughout the densification process. When the power is raised at the end of the densification cycle and the densification front approaches the peripheral or surfaces portions of the part, the liquid/gas boundary is held away from the preform surface because of the wall, thereby improving peripheral densification results. However, in practice it is difficult to maintain a steady spacing between the preform and the wall structure during densification because the environment is very turbulent in the presence of the boiling precursor, and because the gap between the wall and the preform is preferably approximately 5 mm at most.

BRIEF DESCRIPTION OF THE INVENTION

The present invention herein presents a method and apparatus for densifying porous articles using a liquid precursor that addresses issues existing in known approaches to densifying porous articles.

BRIEF DESCRIPTION OF THE DRAWINGS

The present invention will be even more clearly understood with reference to the drawings appended hereto, in which.

It is noted that all illustrated features, even within one Figure, are not necessarily to scale, and that some features in a Figure may not necessarily be on the same relative scale as other features in that Figure.

DETAILED DESCRIPTION OF THE INVENTION

As mentioned above and as is known in the art generally, it is desirable in densification processes to densify an article as completely as possible. Accordingly, in the case of densification using film boiling, where densification starts from the core or interior of the article being densified, this means that densification reaching the outermost surfaces of the article is desired. In conventional film boiling processes, this generally requires a high power level during a film boiling process, particularly at the end of the densification cycle. For example, to densify a 20 inch carbon brake disk (i.e., such that the densification front moves substantially up to the surface of the brake disk) may require more than 70 W/cm$^2$ at the end of the cycle when the part is heated with direct coupling. This power requirement adds to production costs.

One way to decrease this power consumption is to physically insulate the preform as mentioned above in the description of conventional approaches to this problem. However, insulating the preform very often affects homogeneity of the densification. That is, the preform does not densify consistently throughout its volume. In particular, wrapping a preform with insulation such as carbon felt or a PTFE textile as described in U.S. Pat. No. 5,981,002 and U.S. Pat. No. 6,994,886 can have a negative impact on the core densification.

As is generally known, the high thermal gradient maintained by the surrounding boiling liquid makes rapid densification possible. That is, the core of the preform is the hottest part so densification starts in the volumetric middle or interior of the preform. This avoids the surface sealing problem which commonly occurs during a standard isothermal CVI process (which necessitates time-consuming intermediate machining steps to "reopen" the porosity of the material in order to permit the conventional gaseous precursor to infiltrate the interior of the preform structure).

However, this thermal gradient does not necessarily avoid under-densification of the preform core. Several parameters are involved, including, without limitation, the thermal properties of material of the preform, the porosity distribution in the material being densified, the permeability, and the maximum temperature. A fine balance has to be found between these parameters in order to get the best industrial compromise; a short densification cycle, low power consumption, homogeneous densification, and suitable preform architecture (this last one mostly dependent on the final intended use of the part).

For example, a way to improve the densification homogeneity is to decrease the process temperature, but at the same time this will problematically increase the cycle time. Another way to improve densification homogeneity is to modify the preform so that it is optimized for a short densification cycle time and high densification levels, but this does not necessarily lead to optimal characteristics for the final desired use of the article. In addition, modifying each preform individually can complicate production as each individual preform has to be modified in a certain manner.

In the case of carbon preform disks for aircraft brakes, the preform architecture is not usually optimized for film boiling according to the criteria emphasized above. Compared with an optimized preform, an "aircraft" preform generally requires a lower densification temperature to start the cycle (meaning longer cycle time), may possibly use more power, eventually giving a lower bulk density.

Thus, a method and apparatus is provided to improve the edge densification of a preform being densified by film boiling without compromising the core densification or increasing the cycle time.

In the description hereinbelow, reference will be made primarily to annular preforms for brake disks, but this is strictly by way of example and without implied limitation, and the present invention can be understood to apply more generally to the densification of porous articles.

As mentioned above, U.S. patent application Ser. No. 12/210,228, now U.S. Pat. No. 8,163,339, discloses fixing a PTFE mesh having significant open porosity to opposing wear surfaces of an annular preform. The mesh is fixed throughout the densification process, for example, by being bound by a thread or yarn. In the alternative, the preform to be densified in U.S. patent application Ser. No. 12/210,228, now U.S. Pat. No. 8,163,339, is mounted at a fixed distance between two barrier walls or the like, and the combination of the preform and the pair of walls is mounted between a pair of pancake induction coils, as is conventionally used in film boiling processes.

In the present invention, the above-described open porosity PTFE mesh or barrier wall is selectively used only near an end of the liquid densification process, after the densification process approaches the exterior peripheral surfaces of the article being densified and densification is about 50% to about 80% complete. In general, this approach minimizes technical issues noted with the approaches described in U.S. patent application Ser. No. 12/210,228, now U.S. Pat. No. 8,163, 339, while still providing the overall advantages provided by insulating an article to be densified using a film boiling process.

1. Mesh Mounted on Frame

In a first embodiment of the present invention, first and second PTFE mesh portions are mounted on respective rigid peripheral frames. Instead of binding or otherwise fixing the mesh portions directly to the preform, as in U.S. patent application Ser. No. 12/210,228, now U.S. Pat. No. 8,163,339, each mesh portion is initially held relatively distant from the preform during an initial, relatively low power part of the densification process (FIG. 2a), and then each mesh portion, located on respective sides of the preform and generally parallel therewith, is slid towards the preform to establish a sufficient separation (usually about 5 mm or less) to insulate the surface of the preform to promote a better final densification closer to the peripheral surfaces of the preform. See, generally, FIG. 2b.

Figure 1:
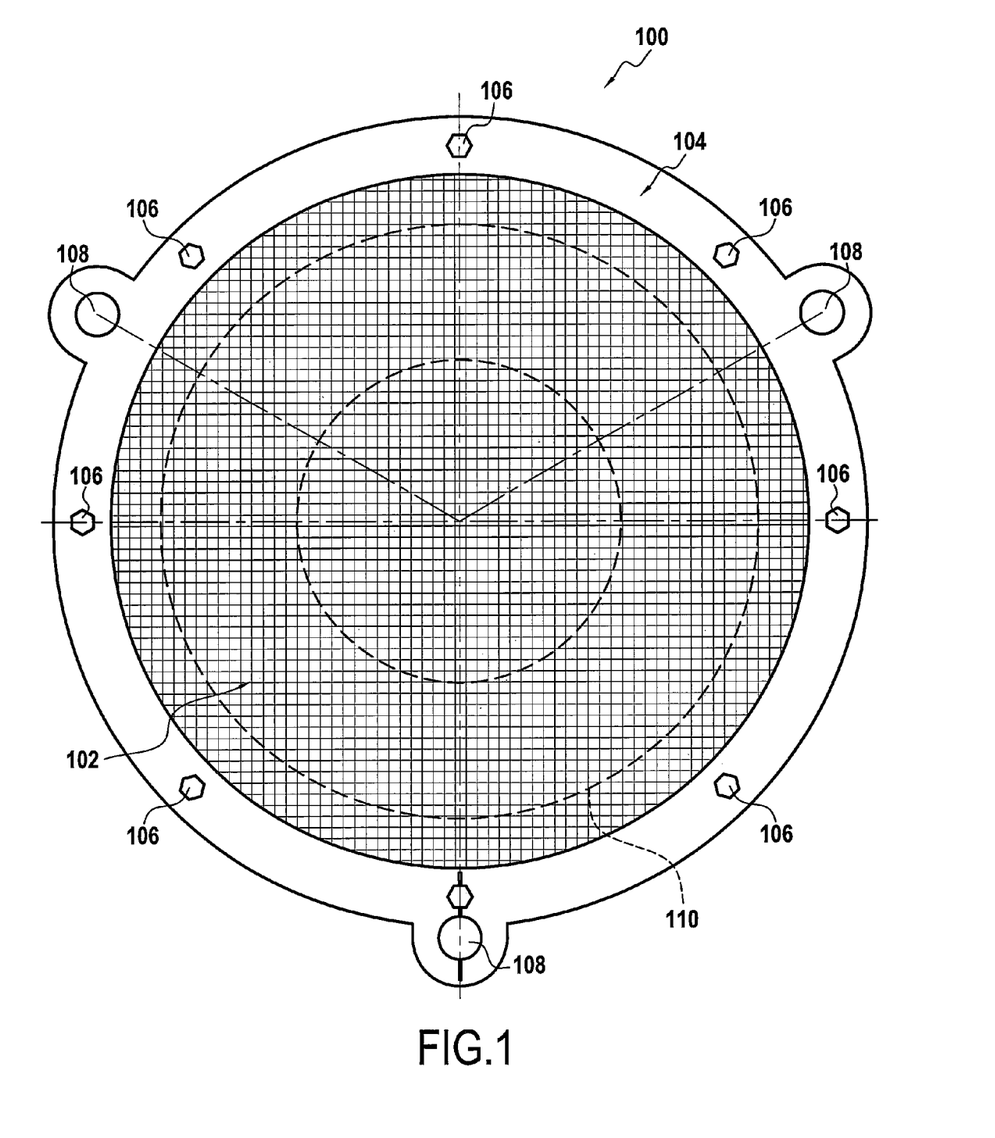
FIG. 1 is a plan view of an open porosity mesh mounted on an annular frame.

As seen in FIG. 1, a mesh assembly 100 includes an open porosity mesh portion 102 (which is relatively flexible) mounted at its periphery by a comparatively rigid frame 104. The mesh portion 102 and frame 104 may be, for example, generally round, particularly in the case of an annular preform for a brake disk, but any geometric form is within the scope of the invention in this regard. In a particular example, the frame 104 may include two generally similar or even identical ring portions that are, for example, bolted together using bolts 106, with a peripheral edge of mesh portion 102 fixedly sandwiched therebetween. Any suitable fixation means can be used instead of bolts 106.

Figure 2A:
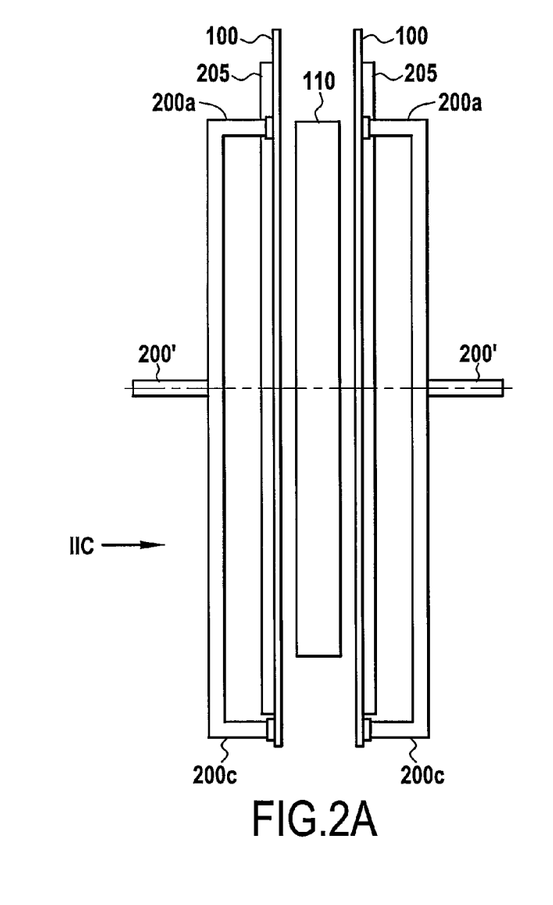
FIGS. 2a and 2b are schematic side views illustrating different stages in a film boiling densification process according to a first embodiment of the invention and FIG. 2c is a schematic plan view seen along direction 110 (indicated in FIG. 2a) illustrating the positional relationship of certain elements according to this embodiment of the invention.
Figure 2B:
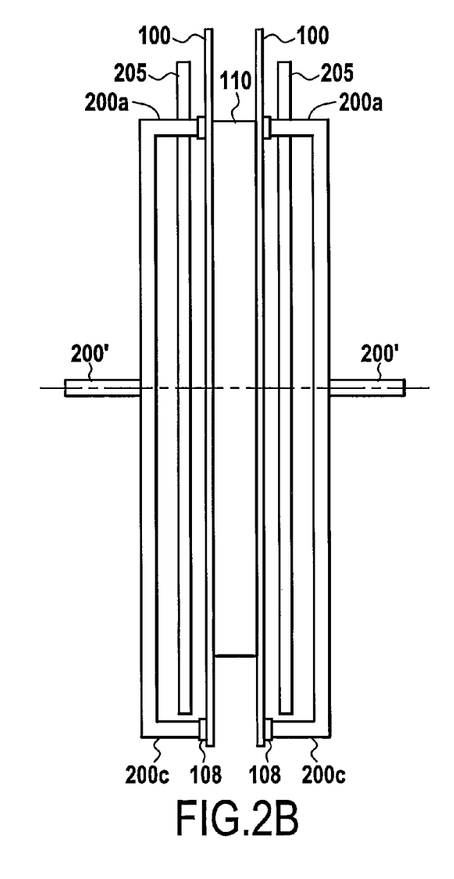

The frame 104 is provided with one or more (preferably, but not necessarily, two or more) support points 108 about its outer edge, by which the mesh assembly 100 is supported in the film boiling chamber and by which the mesh assembly 100 is moved towards and away from the preform (schematically indicated in FIG. 1 at 110). The support points 108 may be sleeves or bushings or the like, through which a respective support rod (not shown, but generally spanning the reaction chamber along a direction perpendicular to the mesh assembly 100 and preform 110) is passed and along which the mesh assembly 100 is slid as desired, such as by a manually actuated push rod or the like. In the alternative, the support points 108 may be points at which respective ends of support rods may be attached (such as, for example and without limitation, by welding or by heat resistant adhesive or by bolting), permitting the mesh assembly 100 to be pushed and pulled into place as desired. In one example of a support rod assembly, as illustrated in FIGS. 2a and 2b, the respective support points 108 may be associated with a respective group of support rods 200a, 200c (200b not being visible in the view of FIGS. 2a and 2b) that converge at a central point to be connected with a single main support rod 200' that extends out of the reaction chamber for moving the mesh assembly 100 as desired. A similar arrangement is discussed in more detail below relative to a second embodiment of the present invention, but that description is fully usable in this embodiment as well.

In general, first and second mesh assemblies are used in a film boiling apparatus as is generally known, with only a few modifications. In general, as seen in FIGS. 2a and 2b, first and second mesh assemblies 100 are provided on opposite sides of an annular preform 110 that is being densified using a film boiling process, between a pair of induction coils 205 as is known in the prior art. The first and second mesh assemblies 100 are maintained generally parallel with the preform mounted therebetween, inwards of the pair of induction coils 205. In the embodiment illustrated taking together FIGS. 1, 2a, and 2b, it will be understood that a diameter of the mesh assembly 100 across frame 104 will be generally greater than a diameter of a respective pancake induction coil 205. It will therefore be understood that the support arm mechanism 200, 200' is arranged effectively around or outside of the area of the pancake induction coils 205.

Figure 2C:
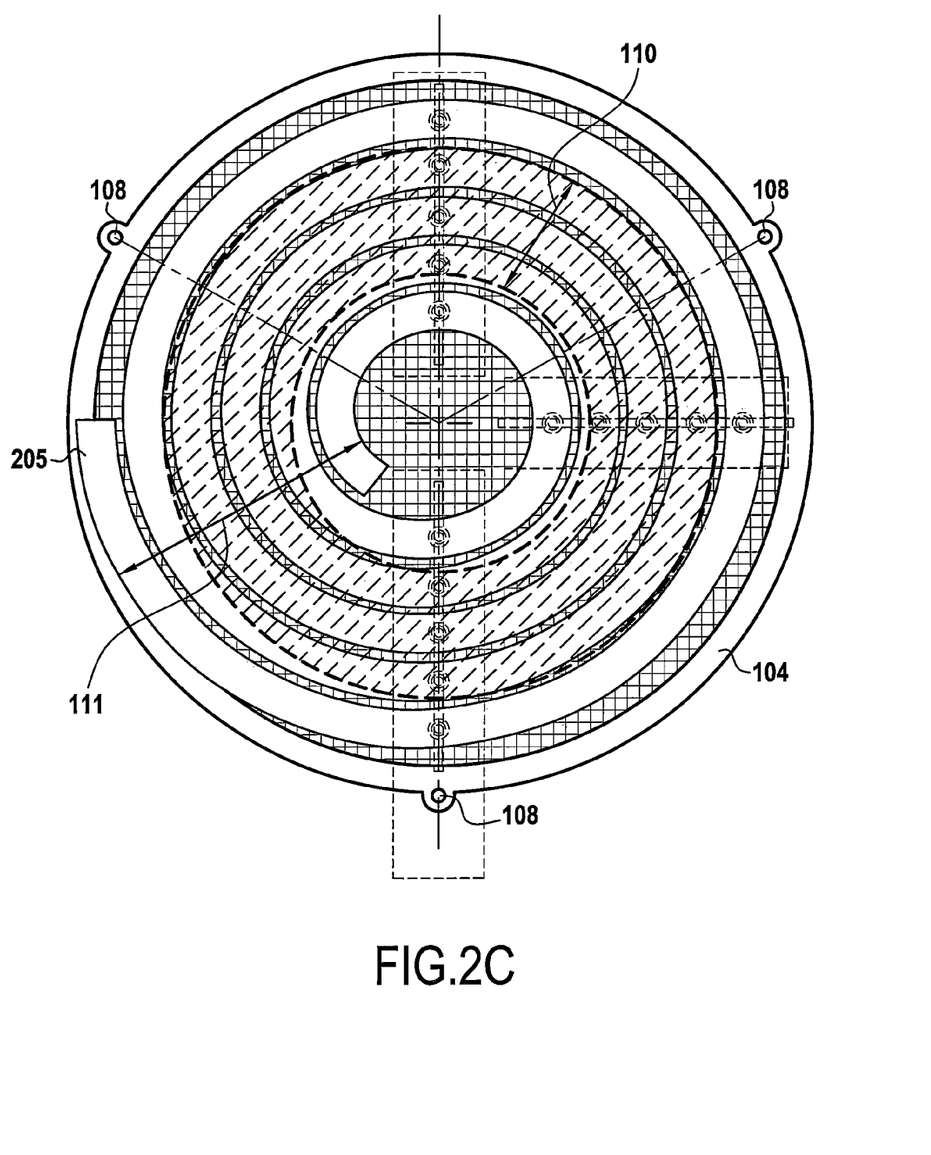

FIG. 2c is a very schematic view illustrating a positional relationship between preform 110, pancake induction coil 205, and mesh assembly 100 therebetween, taken along line IIC shown in FIG. 2a. As can be understood from FIG. 2c, a diameter of the mesh assembly 100 is the largest, with the diameter of the pancake induction coil 205 being slightly smaller. A radial width of the coils of the pancake induction coil 205, from an inner diameter to an outer diameter, is generally indicated at 111. A radial width of the preform from an inner diameter to an outer diameter is indicated by 110.

A mounting arrangement for an annular preform that is usable in accordance with this embodiment of the present invention as well as with a second embodiment described below, is described in more detail later with reference to FIG. 6.

The mesh portion 102 is made from a mesh material having a significantly greater open porosity (for example, between about 30% and about 60%) than the conventionally used Gore-Tex® PTFE textile. The material of the open mesh preferably has some or all of the following characteristics: chemically stable in the boiling precursor; able to withstand the temperature when the densification front gets to the surface of the material being densified so the insulation remains intact; stiff enough to provide a substantially constant contact between the preform and the insulation material (although sufficient stiffness can be provided by the frame 104); and may be electrically insulative if the preform heating is done by electromagnetic direct coupling.

An example of an appropriate PTFE mesh material is ET8700, commercially available from InterNet, the mesh having openings each having a major dimension of 6 mm (0.236") and a minor dimension of 3 mm (0.118"). An alternative mesh material may be a woven fiberglass material, manufactured using known methods to define a similarly dimensioned mesh.

The frame 104 may be made from G10 composite material, as may the bolts 106. The support rods used to support and/or move the mesh assemblies 100 may also be made from G10 or another material suitable for the environment found during operation of the film boiling reaction chamber.

In an example using the presently described embodiment of the invention, densification of a 20" aircraft brake disk by film boiling is carried out, in which the preform is heated by electromagnetic direct coupling. The preform is made from carbon fiber in a known manner, and the liquid pyrocarbon precursor is cyclohexane. Film boiling is performed generally according to any one or more of U.S. Pat. Nos. 4,472,454, 5,389,152, 5,397,595, 5,733,611, 5,547,717, 5,981,002 and 6,726,962, using parallel pancake inductive coils as described in those documents. Each of these documents is incorporated herein by reference in their entirety in all jurisdictions and venues where incorporation by reference is permitted.

The brake disk is then densified according to the film boiling process as is known in, for example, any one or more of U.S. Pat. Nos. 4,472,454, 5,389,152, 5,397,595, 5,733, 611, 5,547,717, 5,981,002 and 6,726,962; and PCT patent application PCT/EP2007/058193, PCT/EP2007/058195, and/or PCT/EP2007/058197, each of which is incorporated by reference herein in entirety in all jurisdictions and venues permitting the practice of incorporation by reference.

Once the densification cycle is completed, the mesh assemblies 100 may be re-used in accordance with the wear and durability of the mesh material 102 selected.

2. Liquid/Gas Boundary Insulation

U.S. patent application Ser. No. 12/210,228, now U.S. Pat. No. 8,163,339, discloses insulating or otherwise separating the preform from the turbulent liquid precursor. This allows the densification front to move forward closer to the surfaces of the article being densified compared with not using some form of barrier. A relatively stable or calm layer of precursor in gas form is established at the surface of the disk (or other article) being densified, at the end of the cycle when the densification front comes close to the surface, relative to the liquid precursor. This can be achieved by providing a wall or plate member adjacent to the part being densified at a distance of about 1 mm to about 5 mm from the surface of the disk. At the end of the densification cycle, the heat emitted by the part being densified becomes so significant that the liquid precursor is pushed away from the surface of the part, behind (i.e., on the other side of) the wall. At that point, only a layer of gas (composed of precursor vapor and gaseous by-products) surrounds the part. This layer of gas acts like an insulating layer, and significantly reduces cooling of the part surface (caused when the relatively cool liquid precursor contacts the part), so the densification front can move forward even closer to the surface.

According to this embodiment of the invention, and differently from U.S. patent application Ser. No. 12/210,228, now U.S. Pat. No. 8,163,339, the walls are initially retracted away from the preform while the power is still relatively low during the first stage of densification, during which the preform is surrounded by the liquid precursor. Later during densification, particularly, at a stage at which the power is significantly increased to finish densification, the walls are moved into close proximity (for example, between about 1 mm and about 5 mm) to the respective sides of the preform.

Figure 3:
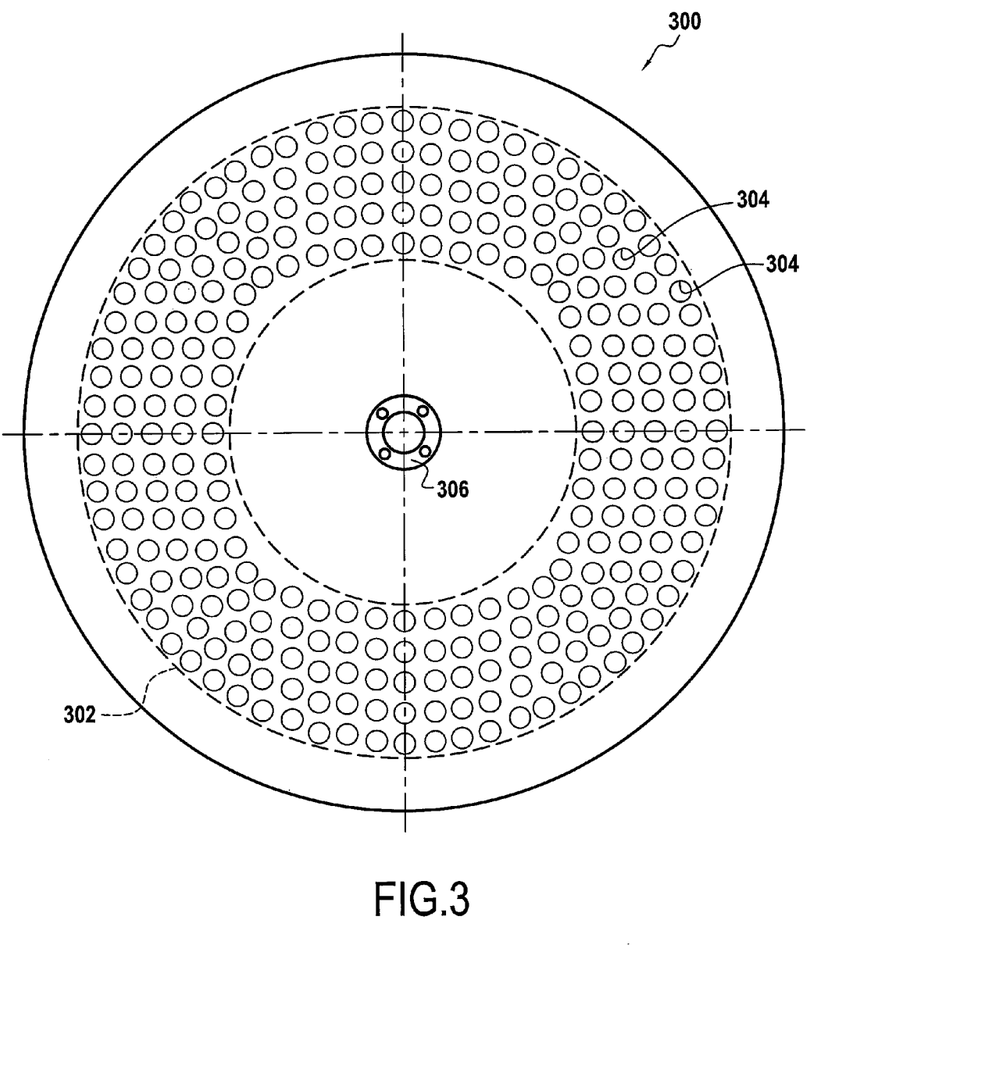
FIG. 3 is a plan view of a perforated plate that is used as a movable barrier wall according to a second embodiment of the invention.

In more detail, FIG. 3 is a plan view of a perforated plate 300 used in this second embodiment. The plate 300 is illustrated as being round, but the specific form of the plate need only be suitable and compatible with other structural requirements and constraints in the densification, such as, by way of example, the shape and size of the induction heating coils used in the densification apparatus.

The positioning of an annular preform being densified, relative to the size and extent of the plate 300, is schematically indicated by dotted lines at 302. In one arrangement, the diameter of plate 300 is greater than the outside diameter of preform 302, and the plate 300 and preform 302 are generally arranged coaxially relative to each other.

A portion of plate 300 is perforated by a plurality of holes 304 or other openings passing through from one face of the plate 300 to the other. The holes 304 may be, for example; between 1 mm and 5 mm in diameter. The holes 304 may be formed, for example, by a laser or by water jet cutting, in a known manner. As a general matter, smaller diameter holes 304 are preferred, under the general constraint that holes that are too small may be prone to being plugged by solid particulate matter present in the liquid precursor, and that holes that are too large will cause noticeable differences in densification corresponding with the location of the too-large holes. In a particular example, the size and density of holes 304 are adjusted to provide an open porosity of 20% to 40%.

The material used to make the plate 300 must be able to chemically and thermally withstand the boiling precursor in the film boiling process. When the article being densified is heated by direct electromagnetic coupling, the material used must additionally be electrically non-conductive. G10 glass, PTFE, concrete, and ceramic materials are examples of suitable materials for this application.

In one example, the plate 300 may be provided with a mounting fixture or mounting point 306 at its center. As will be illustrated hereinbelow, the plate 300 can be mounted and supported via the mounting fixture 306 so that the plate 300 can be selectively moved towards and away from a preform being densified in accordance with this second embodiment of the invention.

FIGS. 4a and 4b and FIGS. 5a and 5b illustrate first and second variants of the second embodiment, using two different mechanical arrangements for moving plates 300 towards and away from preform 302.

Figure 4A:
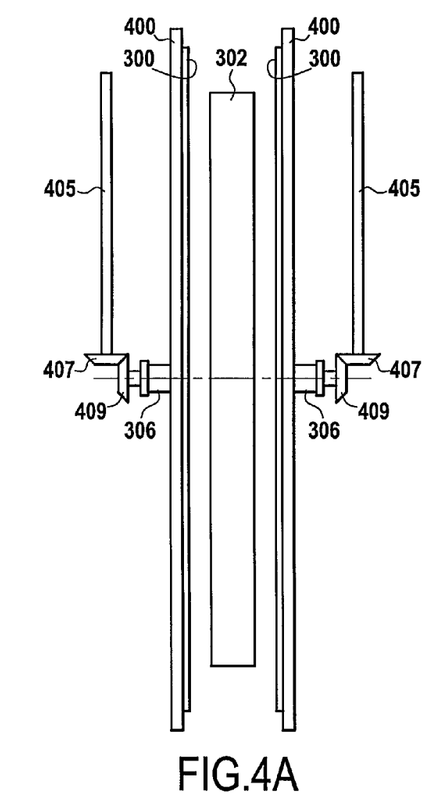
FIGS. 4a and 4b are side views illustrating different stages in a film boiling densification process according a first variant of a second embodiment of the invention.
Figure 4B:
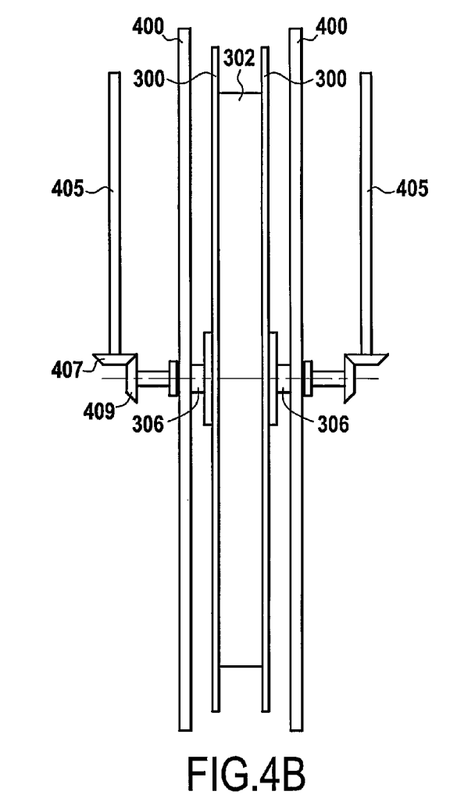

In FIGS. 4a and 4b, an apparatus for film boiling densification according to this second embodiment is schematically illustrated. A pair of pancake induction coils 400, for example, spiral induction coils, is arranged generally in parallel with a spacing therebetween sufficient to provide a preform 302 (or other article being densified) therebetween.

A pair of perforated plates 300 as described above are provided inward of the pair of induction coils 400. That is, each perforated plate 300 is on the side of a respective induction coil 400 adjacent to the preform 302. A protruding mounting fixture 306 is provided on an outward side of each plate 300, the mounting fixtures 306 each extending axially through an open central part of a corresponding induction coil 400 so as to extend to the opposing exterior side of the induction coil 400. As mentioned above, the preform 302 and the pair of plates 300 are arranged to as to be generally coaxial.

In accordance with the present invention as illustrated in FIG. 4b, at a desired moment (generally corresponding with the increase in power near the end of densification), each plate 300 is moved along the axis of fixture 306 towards the preform so as to help improve the surface densification of preform 302. At this point, densification proceeds as described in U.S. patent application Ser. No. 12/210,228, now U.S. Pat. No. 8,163,339, and is therefore not described in substantial detail here.

In a first variant of the second embodiment, a bevel gear drive assembly is used to move the plates 300 as desired. As seen in FIGS. 4a and 4b, each plate is associated with a first rotatable drive shaft 405 having a first bevel gear 407 at an end thereof. The opposite end of drive shaft 405 is directly or indirectly (such as via gearing) to a conventional rotatable drive source (not shown) such as a rotary electric motor, particularly a motor that can be switched on and off with some precision. The respective shafts 405 may be connected to respective drive sources or to the same drive source.

An outwardly (i.e., away from the preform 302) extending end of axially protruding fixture 306 is provided with a second bevel gear 409 arranged so as to engage and cooperate with bevel gear 407. As is well understood, the driven drive shaft 405 turns bevel gear 407, which in turn drives bevel gear 409 into, rotation. Second bevel gear 409 may be, for example, connected to a conventional ball screw device (not illustrated visibly, but, for example, generally disposed in a known manner within axially protruding fixture 306. As is also well-known, the rotation of bevel gear 409 is converted into a linear displacement by the ball screw. The resultant linear displacement generated by the ball screw along the axis of the fixture 306 causes the plates 300 to move towards or away from the preform 302 as desired.

It will be appreciated that the drive source that drives shaft 405 may be computer controlled or may be manually switched on and off. Preferably, conventional safeguards are provided to prevent the plates 300 from being pressed too close to preform 302 and also to prevent overtorque. For example, drive shaft 405 may be permitted to slip relative to the drive source if threshold torque is exceeded.

It will also be appreciated that the illustrated arrangement of bevel gears 407, 409 is strictly by way of example. In a different example of this variant, a ball screw assembly could be directly driven in rotation to provide the above-described linear movement of the perforated plates 300.

Figure 5A:
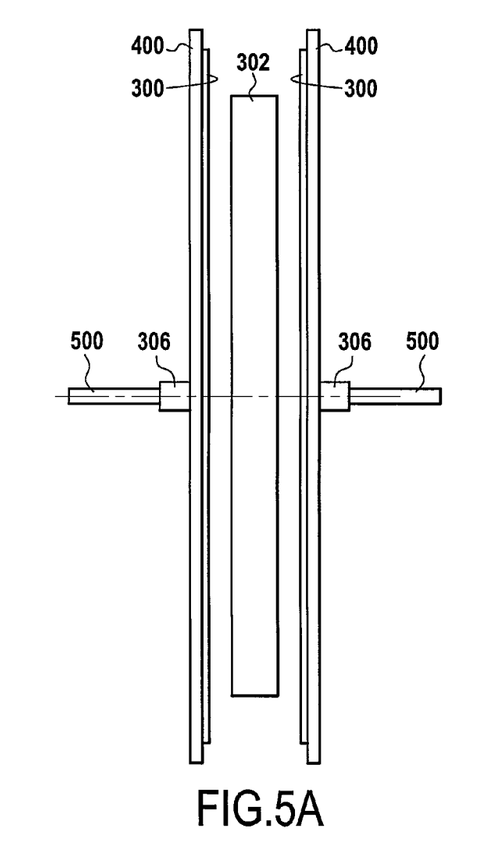
FIGS. 5a and 5b are side views illustrating different stages in a film boiling densification process according to a second variant of the second embodiment of the invention.
Figure 5B:
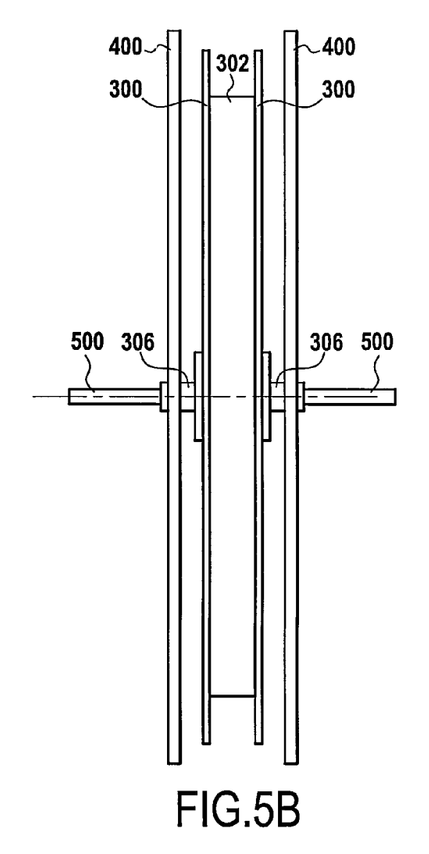

In FIGS. 5a and 5b, the plates 300 are mounted in a manner generally similar to that illustrated in FIGS. 4a and 4b. Here, however, the fixtures 306 are mounting points to which are attached push rods 500 extending outwardly along a central axis X of the combination of the preform 302, plates 300, and pancake induction coils 400. The push rods 500 may be driven from an exterior of the film boiling reaction chamber by any suitable source of linear motion.

Although not illustrated in detail here, it is contemplated that push rods 500 will extend through the walls of the reaction chamber of the densification apparatus in sliding manner. This will require the provision of seals about the push rods 500 at the point at which the push rods 500 pass through the walls of the reaction chamber. It will be evident to the skilled person that such seals need to be selected from a material that can provide sufficient sealing against leaks of the liquid precursor, given the operating environment in question as well as the load of the rods 500 against the seals. Likewise, the push rods 500 must also be made from a material that can withstand the operating environment in a film boiling densification apparatus. G10 or other ceramic or composite materials are good candidates this regard.

This method has similar benefits as using an insulating layer directly wrapped around the disk, such as the open porosity mesh material described hereinabove. For example, the maximum required power to completely densify the part is generally decreased. Also, there is no negative effect on the densification of core regions of the part being densified, and there is relatively improved densification homogeneity at the surface of the article being densified. Finally, no special preparation of the part itself is required before the densification process—the same appropriately constructed densification apparatus can be used for a plurality of parts. This results in time and cost savings in efficiently running a densification process.

This approach is an improvement over the approach described in U.S. patent application Ser. No. 12/210,228, now U.S. Pat. No. 8,163,339, in that the perforated plates 300 are put into position only at the end of the densification process when the power level is being increased. At that point, the densification front is generally approaching the peripheral surfaces of the article being densified, and the above described gaseous precursor layer is maintained between the perforated plate 300 and the surface of the preform being densified, so as to promote densification towards the surfaces of the preform. The distance between the surface of the preform and the perforated plates may be maintained using spacers such as pins or rods made from a ceramic and disposed between the preform and the perforated plates.

Perforated plates are mentioned here by way of example. The plates 300 may be also be solid (i.e., without perforations), or perforated with a constant number of holes or openings per unit surface area (i.e., a kind of mesh or screen), or perforated in only certain areas thereof. However, a preferable example is perforated in accordance with the description related to FIG. 3 herein.

Experiments suggest that there is a maximum distance between the perforated plate and the preform surface of about 5 mm, beyond which no effect of the perforated plate is observed up to a maximum power of 70 W/cm$^2$.

At 3 mm away from the preform surface, and at 70 W/cm$^2$, the cooling of the perforated plates 300 by the surrounding liquid/vapors is still sufficient to permit G10 to be used to make the perforated plates 300 (the G10 being the lowest temperature rated material tested).

As stated initially, in both the first and second embodiments of the present invention, most of the densification cycle is realized at relatively low power because the preform itself insulates the core or interior portion of the preform from the relatively cool liquid precursor. It is only when the densification front gets close to the edge of the disk (a few mm) that the power needs to be dramatically increased (typically by four to five times the initial power level).

Thus, the invention consists of realizing the densification cycle two steps: a first step of "low power" densification, where no insulation is used on the wear faces and the densification front is brought up to a few millimeters under the surface, and densification of 50 to 80% of the volume is completed; and a "finishing" densification where wear surfaces are insulated using either the first or second embodiment of the invention described here, and the power increased until the appropriate volume densification is completed.

The point at which insulation is provided to the preform relies on power control techniques, such as that disclosed in co-pending PCT Patent Application PCT/EP2007/058197. During the above-mentioned first step of low power densification, the power has minimal fluctuations over time. Usually there is a very slight power increase (usually less than about 0.2 W/min$^{-1}$). In the second finishing step, the power rate increase is more significant—between about 0.2 W/min$^{-1}$ and about 1.5 W/min$^{-1}$. Moving the insulating material—that is, the mesh assembly 100 of the first embodiment or the perforated plates 300 of the second embodiment—is done between these two steps.

Figure 6:
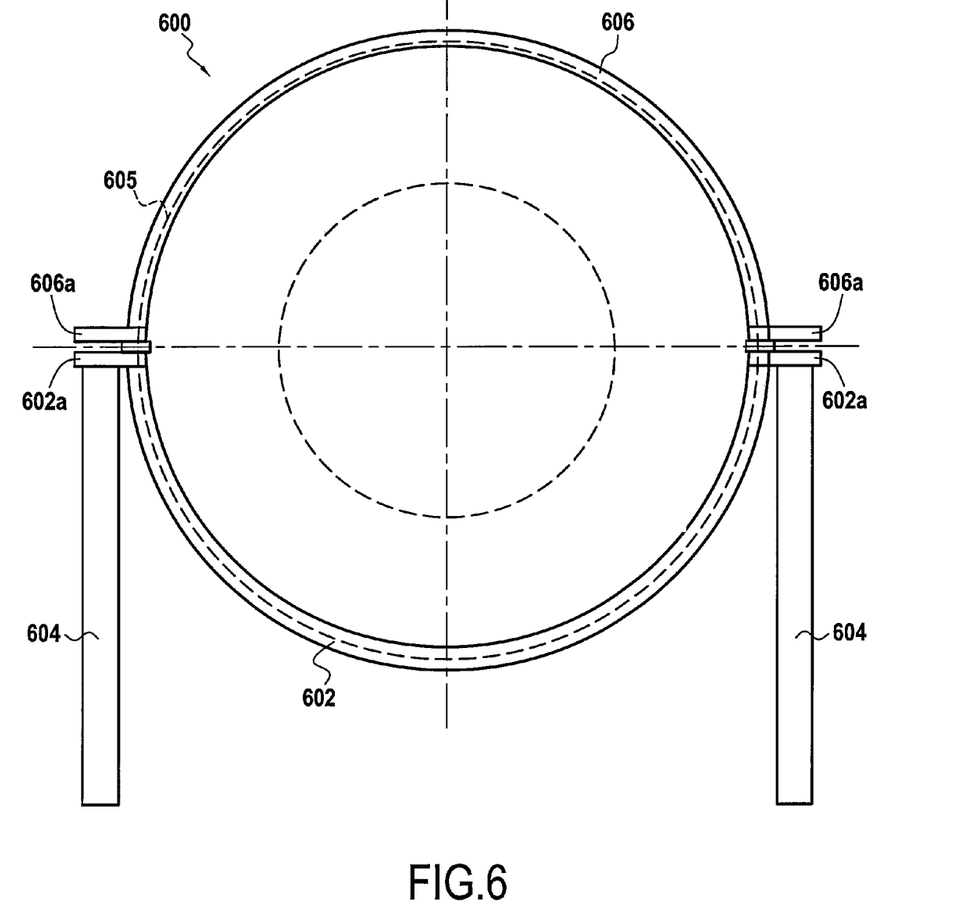
FIG. 6 is a general example of a support structure for an annular preform to be densified, usable with either the first or second embodiment of the present invention.

FIG. 6 illustrates an example of a cradle for the preform, usable with the first or the second embodiment of the invention. In general, a cradle assembly 600 comprises a lower portion 602 supported on legs 604. The legs typically extend to the lower floor of the film boiling reaction chamber (not illustrated) and are sized and mounted in such a manner as to provide substantially stable mechanical support to the preform (schematically indicated at 605) supported thereby.

The cradle assembly 600 further includes an upper portion 606 sized so as to correspond with lower portion 602 to support preform 605 therebetween. The upper portion 606 may be engaged with lower portion 602 in a conventional manner, such as by way of conventional clamps, screws, or bolts, not expressly shown here, fixing together flange members 602a and 606a. Flange members 602a may also be the points at which legs 604 are connected to the rest of the cradle.

One or both of the upper portion 606 and the lower portion 602 may be provided with radially inwardly extending lips or flanges on the respective axial edges thereof, so as to define a retaining groove therebetween, into which a radially outwardmost edge of preform 605 is received for even better retaining and supporting the preform 605 in the cradle assembly 600. These lips or flanges, which are axially outward of the preform 605 may be sized so as to act as spacers to maintain either mesh assemblies 100 or perforated plates 300 in the first and second embodiments of the invention a small distance (a few millimeters) away from the preform. See FIGS. 2b, 4b, and 5b, to better understand this arrangement.

One or both of the upper portion 606 and the lower portion 602 may be made from a composite material such as fiber (especially glass fiber) reinforced concrete, or other composite or non-composite material suitable for the operating conditions found within the film boiling reaction chamber. One or both of the upper portion 606 and the lower portion 602 may be perforated (for example, between about 20% and about 40% open area) using known fabrication methods to allow the liquid precursor to reach peripheral edges of the preform 605 during densification.

It will be understood by the person skilled in the art that FIGS. 2a, 2b, 4a, 4b, 5a, and 5b omit certain conventional features in order to clearly illustrate the present invention, such as supports for the various drive rods and push rods. These features are known in the art and do not form part of the present invention.

Although the present invention has been described above with reference to certain particular examples for the purpose of illustrating and explaining the invention, it is to be understood that the invention is not limited solely by reference to the specific details of those examples. More specifically, a person skilled in the art will readily appreciate that modifications and developments can be made in the preferred embodiments without departing from the scope of the invention as defined in the accompanying claims.

What is claimed:

1. A method of densifying a porous substrate comprising:
   in a reaction chamber, submerging the porous substrate in a liquid precursor so that the liquid precursor infiltrates pores in the porous substrate; and
   inductively heating the submerged porous substrate to a temperature sufficient to cause liquid precursor to pyrolyze and deposit a decomposition product within the pores of the substrate so as to densify the porous substrate, using a first power level;
   increasing the power level above the first power level as a densified region within the porous substrate approaches an exterior surface of the porous substrate;
   moving a barrier towards a surface of the porous substrate when the power level is increased above the first power level, the barrier being constructed and arranged to permit some contact between the liquid precursor and the porous substrate.

2. The method according to claim 1, wherein the barrier comprises a porous mesh material layer.

3. The method according to claim 2, wherein the porous mesh material layer is supported by a rigid frame at its periphery.

4. The method according to claim 2, wherein the porous mesh material layer has an open porosity of between about 30% and about 60%.

5. The method according to claim 4, wherein the porous mesh material layer is supported by a rigid frame at its periphery.

6. The method according to claim 4, wherein the porous mesh material layer is a polytetrafluroethylene ("PTFE") mesh material.

7. The method according to claim 6, wherein the porous mesh material layer is supported by a rigid frame at its periphery.

8. The method according to claim 1, wherein the barrier comprises at least one plate member disposed so as to be generally parallel to a surface of the porous substrate.

9. The method according to claim 8, wherein the barrier comprises two substantially parallel plate members located on opposing sides of the porous substrate.

10. The method according to claim 9, wherein a peripheral region between the two substantially parallel plate members is open to the liquid precursor.

11. The method according to claim 1, wherein the liquid precursor comprises a hydrocarbon.

12. The method according to claim 11, wherein the hydrocarbon is selected from the group consisting of cyclopentane, cyclohexane, 1-hexene, gasoline, toluene, methylcyclohexane, n-hexane, kerosene, hydrodesulfurized kerosene, benzene, and combinations thereof.

13. The method of claim 1, wherein the decomposition product comprises carbon.

14. The method according to claim 1, wherein the liquid precursor contains an organosilane.

15. The method according to claim 14, wherein the organosilane is selected from the group consisting of methyltrichlorosilane, dimethyldichlorosilane, methyldichlorosilane, and tris-n-methyl amino silane.

16. The method according to claim 14, wherein the decomposition product comprises silicon carbide and silicon nitride.

17. The method according to claim 16, wherein the decomposition product is one of carbon/silicon carbide or carbon/silicon nitride.

18. The method according to claim 1, wherein the liquid precursor is a mixture of an organosilane and a hydrocarbon.

19. The method according to claim 1, comprising selectively moving the barrier away or towards the surface of the porous substrate.

20. The method according to claim 1, wherein a distance between the barrier and the surface of the porous substrate along a direction perpendicular to a longitudinal axis of the porous substrate when the power level is below the first power level is greater than a distance between the barrier and the surface of the porous substrate along said direction when the power level is above the first power level.

21. The method according to claim 20, wherein said distance between the barrier and the surface of the porous substrate along said direction when the power level is above the first power level is lower than about 5 mm.

* * * * *